(12) United States Patent
Karklinsky et al.

(10) Patent No.: US 12,511,808 B2
(45) Date of Patent: Dec. 30, 2025

(54) VIRTUAL IMAGE GENERATION METHOD

(71) Applicant: Alibaba (China) Co., Ltd., Hangzhou (CN)

(72) Inventors: Matan Karklinsky, Tel Aviv-Jaffa (IL); Gadi Zimerman, Tel Aviv-Jaffa (IL); Sagi Medina, Tel Aviv-Jaffa (IL); Benjamin Aaron Lastmann, Tel Aviv-Jaffa (IL)

(73) Assignee: Alibaba (China) Co., Ltd., Hangzhou (CN)

( * ) Notice: Subject to any disclaimer, the term of this patent is extended or adjusted under 35 U.S.C. 154(b) by 180 days.

(21) Appl. No.: 18/346,487

(22) Filed: Jul. 3, 2023

(65) Prior Publication Data

US 2024/0020902 A1 Jan. 18, 2024

(30) Foreign Application Priority Data

Jul. 13, 2022 (CN) .......................... 202210822365.7

(51) Int. Cl.
*G06T 13/40* (2011.01)
*G06T 19/00* (2011.01)

(52) U.S. Cl.
CPC ............ *G06T 13/40* (2013.01); *G06T 19/006* (2013.01); *G06T 2213/12* (2013.01)

(58) Field of Classification Search
None
See application file for complete search history.

(56) References Cited

U.S. PATENT DOCUMENTS

2021/0390311 A1* 12/2021 Barron .................. G06V 20/41

FOREIGN PATENT DOCUMENTS

| CN | 109445579 A | 3/2019 |
| CN | 110278140 A | 9/2019 |
| CN | 110827378 A | 2/2020 |
| CN | 113163155 A | 7/2021 |
| CN | 114187405 A | 3/2022 |
| CN | 114266695 A | 4/2022 |
| CN | 114721572 A | 7/2022 |

* cited by examiner

*Primary Examiner* — Robert J Craddock
(74) *Attorney, Agent, or Firm* — Finnegan, Henderson, Farabow, Garrett & Dunner, LLP

(57) ABSTRACT

A virtual image generation method includes: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information. The virtual image of the target user has the at least one user attribute feature of the target user.

20 Claims, 4 Drawing Sheets

VIRTUAL IMAGE GENERATION METHOD

CROSS-REFERENCE TO RELATED APPLICATIONS

The present application claims priority to and the benefits of Chinese Patent Application No. 202210822365.7, filed on Jul. 13, 2022, which is incorporated herein by reference in its entirety.

TECHNICAL FIELD

The present disclosure relates to the technical field of computers, and in particular relates to a virtual image generation method.

BACKGROUND

The metaverse is based on the Internet, which can be understood as a digital version of daily life that we are familiar with. The core of the metaverse is a virtual space based on the real world.

The metaverse is based on chip technologies, network communication technologies, virtual reality technologies (e.g., virtual reality (VR), augmented reality (AR), mixed reality (MR), extended reality (XR)), game technologies (e.g., game engines, game codes, multimedia resources), artificial intelligence (AI) technologies, blockchain technologies, and so on.

The image of a real-world user in the metaverse can be called a digital avatar, and the user can use his or her digital avatar to imitate real-world behaviors in the metaverse, such as meeting, shopping, traveling or window shopping, and so on. However, the existing digital avatars are only generated based on some actual features of the user, and the generated digital avatars are rather monotonous, resulting in poor user experience.

SUMMARY

Embodiments of the present disclosure provide a virtual image generation method. The virtual image generation method includes: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information. The virtual image of the target user has the at least one user attribute feature of the target user.

Embodiments of the present disclosure provide a device for augmented reality (AR), virtual reality (VR), mixed reality (MR) or extended reality (XR). The device includes a memory for storing computer-executable instructions and one or more processors configured to execute the computer-executable instructions to cause the device to perform operations comprising: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information. The virtual image of the target user has the at least one user attribute feature of the target user.

Embodiments of the present disclosure provide a non-transitory computer-readable storage medium. The non-transitory computer-readable storage medium stores a set of instructions that are executable by one or more processors of a device to cause the device to perform operations comprising: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information. The virtual image of the target user has the at least one user attribute feature of the target user.

DETAILED DESCRIPTION

Figure 1:
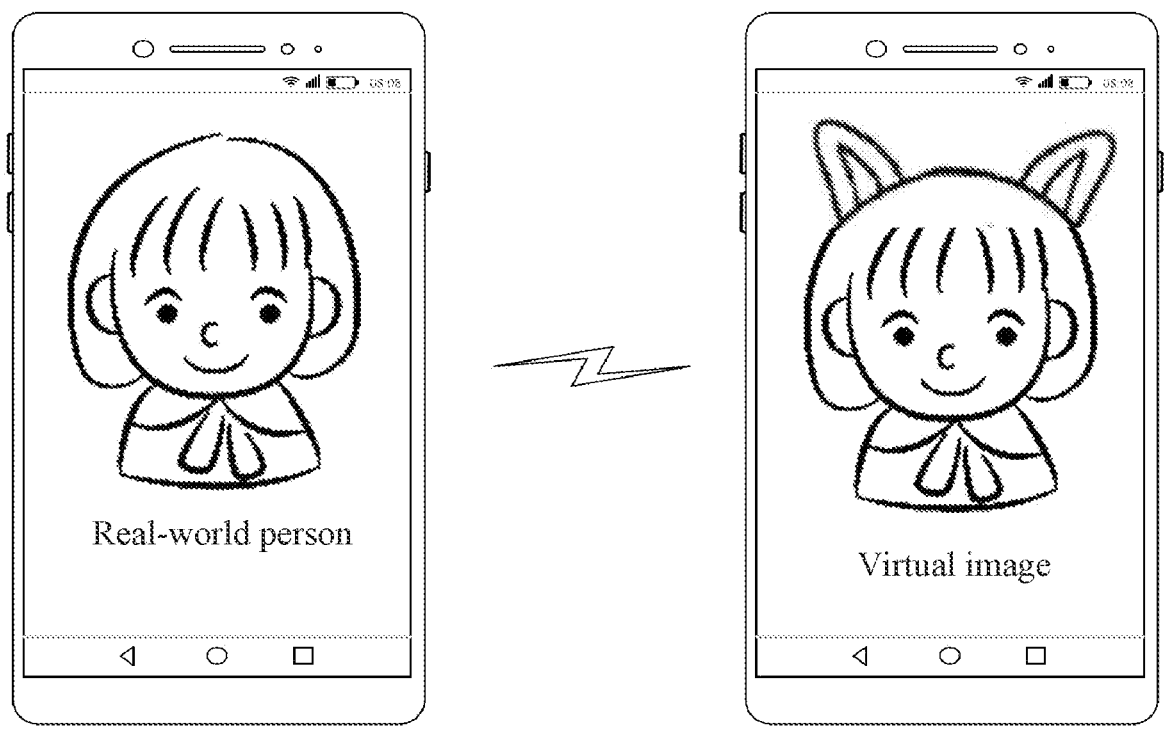
FIG. 1 is a schematic diagram of a specific application scenario of a virtual image generation method according to some embodiments of the present disclosure.

In the following description, numerous specific details are set forth in order to facilitate a thorough understanding of the present disclosure. However, the present disclosure can be implemented in many other ways that are different from those described herein, and those skilled in the art may make similar promotions without violating the connotation of the present disclosure. Therefore, the present disclosure is not limited by the specific implementations disclosed below.

Terminology used in one or more embodiments of the present disclosure is for the purpose of describing specific embodiments only and is not intended to limit the one or more embodiments of the present disclosure. The singular forms "a", "said" and "the" used in one or more embodiments of the present disclosure and the appended claims are also intended to include the plural forms, unless the context clearly indicates other meanings. It should also be understood that the term "and/or" used in one or more embodiments of the present disclosure refers to and includes any or all possible combinations of one or more associated listed items.

It should be understood that while the terms first, second, etc. may be employed in one or more embodiments of the present disclosure to describe various pieces of information, such pieces of information should not be limited to these terms. These terms are only used to distinguish the same type of information from each other. For example, without departing from the scope of one or more embodiments of the present disclosure, the first may also be referred to as the second, and similarly, the second may also be referred to as the first. Depending on the context, the word "if" as used here could be interpreted as "at the time of . . . " or "when . . . " or "in response to a determination".

In the present disclosure, a virtual image generation method is provided. One or more embodiments of the present disclosure relate simultaneously to a virtual image generation apparatus, an augmented reality (AR), virtual reality (VR), mixed reality (MR), or extended reality (XR) device, a computer-readable storage medium, and a computer program, as described in detail one by one in the following embodiments. A virtual image can be a digital avatar, that is, the digital avatar of a real-world user in the metaverse. Extended reality (XR) refers to the combination of reality and virtualization by computers to create a virtual environment that allows human-computer interactions, which is also the collective name for a variety of technologies such as AR, VR, and MR. The integration of these three visual interaction technologies brings the immersion of seamless transition between the virtual world and the real world to the experiencer.

One or more embodiments of the present disclosure address the technical deficiencies present in existing methods. Specifically, with the virtual image generation method according to embodiments of the present disclosure, in response to a login event of a user, based on certain user attribute features of the target user and event attribute information for the target event in which the target user participates, a personalized virtual image of the target user that is easily recognizable by others and matches the participated event is generated by comprehensively considering the user features and event features, thereby improving the user experience.

Reference is made to FIG. 1. FIG. 1 illustrates a schematic diagram of a specific application scenario of a virtual image generation method according to some embodiments of the present disclosure.

FIG. 1 includes a mobile phone terminal with an XR platform installed or loaded. The XR platform can provide a real-world user with one or more virtual spaces (e.g., metaverse) based on the real world. The real-world user can have a digital avatar in the metaverse and can use that digital avatar to imitate the real-world user's behavior in the real world, such as shopping, traveling, participating in various activities, and the like.

During specific implementation, a user registers an account on the XR platform, and the XR platform assigns a unique user identifier to the user and acquires the user attribute features (e.g., facial features, image features, physical features, etc.) of the user. When the user chooses on the XR platform an event to be participated in (e.g., a virtual space event such as a chat event, an activity participation event, etc.) for participation, the XR platform generates, in accordance with the event attribute information for the event (e.g., the location and the time of the event, etc.) and the user attribute features of the user, one or a set of (e.g., two or more) virtual images used for participation in the event for the user, and these virtual images retain some of the user attribute features of the user in the real world so that the user's friends, etc., can recognize the user, thereby improving the user experience.

As shown in FIG. 1, the user chooses a virtual event "Masquerade" with the theme of animals on the XR platform, then the XR platform generates a digital avatar (i.e., a virtual image) with animal horns for the user based on the event and the acquired facial features of the user (a real-world person), with the facial features such as eyes, mouth and nose among the facial features of the virtual image remaining unchanged, so that the user's friends and acquaintances on the XR platform can still recognize the user intuitively and easily. At the same time, the XR platform displays this generated virtual image to the user through the Graphical User Interface (GUI). The user can adjust the virtual image in the GUI interface in order to generate a satisfactory virtual image for the user, thereby further improving the user experience through such user interaction.

Figure 2:
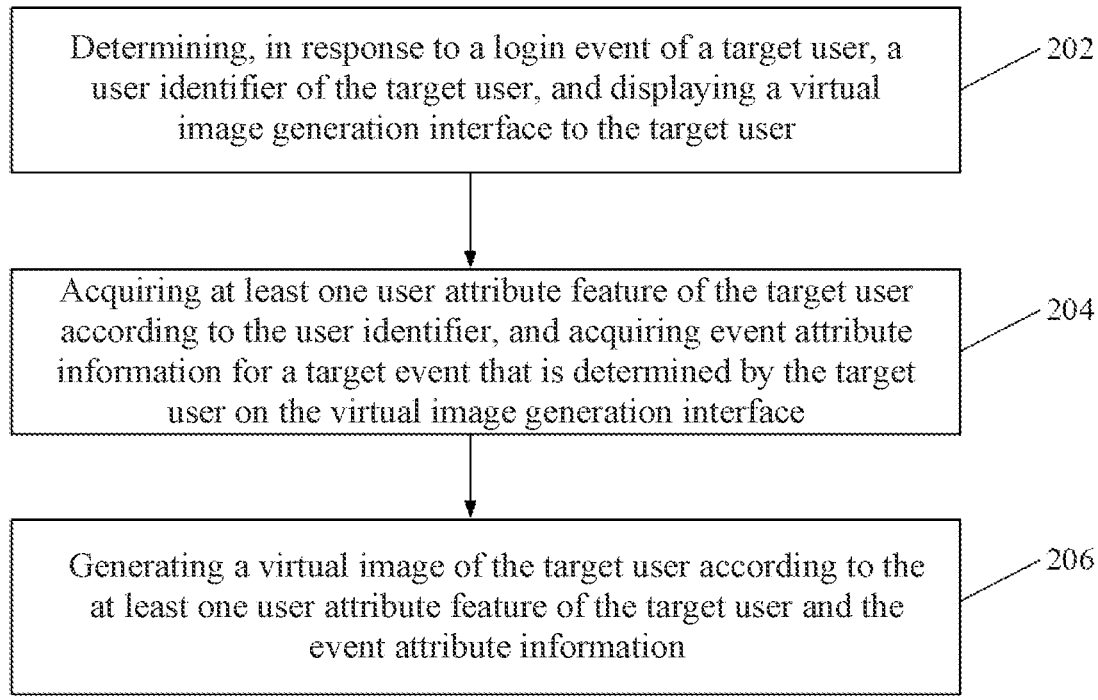
FIG. 2 is a flowchart of a virtual image generation method according to some embodiments of the present disclosure.

Reference is made to FIG. 2. FIG. 2 illustrates a flowchart of a virtual image generation method according to some embodiments of the present disclosure. The method includes the following steps 202, 204, and 206.

In step 202, in response to a login event of a target user, a user identifier of the target user is determined, and a virtual image generation interface is displayed to the target user.

Specifically, this virtual image generation method can be applied to the XR platform described above, or to other virtual image generation platforms. For the ease of understanding, the virtual image generation method provided by the embodiments of the present disclosure is described in detail with application to the XR platform described above as an example.

Here, the target user can be understood as a user for whom a virtual image is to be generated, that is, a real-world user who wants to generate a digital avatar in a virtual space. The user identifier of the target user can be understood as a unique identifier of the user, such as a unique user ID, which is composed by numbers, letters, and/or special characters.

During specific implementation, in response to the login event of the target user can be understood as receiving a login event triggered by an account login operation of the target user on the XR platform, and then responding to the login event.

In actual applications, the target user can input the login account and password in the login interface of the XR platform to login to the XR platform. The XR platform, after receiving the login event from the target user, responds to the login event and acquires the user identifier of the target user corresponding to the login account based on the login account carried in the login event so that the user attribute features of the target user can be accurately acquired based on the user identifier subsequently. The specific implementation is as follows.

The operation of determining, in response to a login event of a target user, a user identifier of the target user includes determining, in response to the login event of the target user, the user identifier of the target user according to the login account carried in the login event.

Before the user can login to the XR platform, the user needs to register a login account on the XR platform to subsequently login to the XR platform based on the registered login account and password so as to generate a virtual image. The specific implementation is as follows.

Before responding to the login event of the target user, the operation further includes: determining, in response to a registration event of the target user, the user attribute feature of the target user according to a user image of the target user carried in the registration event, generating a corresponding user identifier for the target user, and storing the user identifier of the target user and the user attribute feature to a database.

Here, the user image of the target user can be understood as a user photo. The user photo can be a photo of the target user taken in real time while performing registration for the login account or a photo in a local photo album that is uploaded by the target user while performing registration for the login account. The user attribute feature of the target user includes but is not limited to the user's age, occupation, hobbies, facial features, physical features, and the like.

Specifically, in response to the registration event of the target user can be understood as receiving the registration event triggered by the target user clicking the registration control in the registration interface of the XR platform. Then, the login account registration interface is displayed for the target user according to the registration event, and the login account and password input by the target user in the login account registration interface are received to realize the registration of the target user.

After the registration of the login account and password, the target user can, according to the guidance of the XR platform, use the photographing apparatus of the carrier (such as a mobile terminal) for the XR platform to capture the user image in real time or select the user image from the local photo album of the carrier of the XR platform. After receiving the user image, the XR platform performs feature extraction on the user image to acquire the user attribute features of the target user. The specific implementation is as follows.

The operation of determining, in response to the registration event of the target user, the user attribute feature of the target user according to the user image of the target user carried in the registration event includes: displaying, in response to the registration event of the target user, a login account registration interface to the target user according to the registration event; acquiring the user image of the target user upon receiving the login account and password input by the target user through the login account registration interface; and determining the user attribute feature of the target user according to the user image of the target user.

Moreover, the XR platform generates a corresponding unique user identifier for the target user, and stores the user identifier of the target user and the user attribute feature of the target user to a database. In the case where a user login account and password exist for the target user, the XR platform will establish a correlation for the login account, user identifier and user attribute features of the target user in the database, so that after the subsequent login of the target user to the XR platform based on the login account, the XR platform can determine the user identifier of the target user of the login event based on the login account, to accurately acquire the user attribute features corresponding to the user identifier. The specific implementation is as follows.

The operation of generating a corresponding user identifier for the target user, and storing the user identifier of the target user and the user attribute feature to a database includes: generating a corresponding user identifier for the target user according to the login account of the target user, and storing the login account, the user identifier, and the user attribute feature of the target user to the database.

In practical applications, the user attribute feature of the target user may be obtained not through feature extraction of the user image of the target user, but be determined through feature text input by the target user in the user attribute feature input box of the XR platform, and so on. Of course, the user attribute feature of the target user does not have to be determined at the time when the target user registers on the XR platform, and may be obtained through feature extraction from the user photo of the target user that is real-time acquired when the target user logins to the XR platform again for event participation, after registering on that XR platform. The user attribute feature of the target user is acquired when the target user registers on the XR platform and is stored to the database. When the target user subsequently logins to the XR platform for event participation, the user attribute feature of the target user can be quickly acquired from the database according to the user identifier of the target user, and a virtual image can be created in combination with the participation time, thus improving the user experience.

In step 204, at least one user attribute feature of the target user is acquired according to the user identifier, and event attribute information for a target event determined by the target user on the virtual image generation interface is acquired.

Here, the event attribute information includes, but is not limited to, information about the type (e.g., the dance party type, the drinks party type, the club type, etc.), the location, the time, and so on, of the target event.

Specifically, after the step of determining the user identifier of the target user and displaying the virtual image generation interface to the target user, at least one user attribute feature of the target user can be acquired from the database according to the user identifier, and the event attribute information for the target event determined by the target user on the virtual image generation interface can be acquired.

In practical applications, if the function of the XR platform is different, the way in which the target user determines the target event on the virtual image generation interface may be different. For example, if the XR platform includes multiple events that the target user can participate in and the user can generate a virtual image when participating in a certain event on the XR platform, then the target event can be chosen by the target user on the virtual image generation interface of the XR platform. If the XR platform only has the virtual image generation function and the target user wants to generate corresponding virtual images for target events to be participated in for other platforms, the target event can be input by the target user through the input box in the virtual image generation interface. The specific implementation is as follows.

The operation of acquiring event attribute information for a target event determined by the target user on the virtual image generation interface includes: acquiring the event attribute information for the target event that is input by the target user on the virtual image generation interface; or acquiring the event attribute information for the target event that is chosen by the target user on the virtual image generation interface.

In practical applications, if the XR platform is only a virtual image generation interface, then when the target user wants to generate a suitable virtual image for the target event to be participated in, the event attribute information for the target event to be participated in can be sent to the XR platform through the input box of the virtual image generation interface of the XR platform. Then, according to the user attribute feature of the target user and the event attribute information for the target event, the XR platform can subsequently generate a corresponding virtual image for the target user to participate in the target event, thereby improving the user experience.

If the XR platform includes multiple events for the target user to participate in, then in the case where the target user is to participate in a certain event, a virtual image corresponding to the participated event can be generated. That is, the target user can choose a target event among the multiple events on the XR platform to participate in, and the XR platform, after acquiring the target event that is chosen by the target user through the virtual image generation interface, acquires the event attribute information for the target event. According to the user attribute feature of the target user and the event attribute information for the target event, the XR platform can subsequently generate a corresponding virtual image for the target user to participate in the target event, thereby improving the user experience.

Of course, even if the XR platform includes multiple events for the target user to participate in, in order to further improve the personalized experience of the target user, the target user can create a new event on the XR platform and set the corresponding event attribute information for the new event. According to the user attribute feature of the target user and the event attribute information for the target event, the XR platform can subsequently generate a corresponding virtual image for the target user to participate in the target event, thereby improving the user experience.

In step 206, a virtual image of the target user is generated according to the at least one user attribute feature of the target user and the event attribute information. The virtual image of the target user has the at least one user attribute feature of the target user.

Specifically, after acquiring the at least one user attribute feature of the target user and the event attribute information, the XR platform can generate a virtual image of the target user according to the at least one user attribute feature and the event attribute information. The virtual image of the target user at least has one user attribute feature so that the target user's friends or acquaintances on the XR platform can quickly and easily recognize the target user, thus providing a good participation experience for the user.

For example, User A chooses on this XR platform to participate in a costume party, and the XR platform generates a corresponding virtual image for User A after acquiring the facial features of User A (e.g., high nose, double eyelids, dark skin, etc.) and the event attribute information for the costume party (for example, the costume party has a theme of animals, the time is at night, etc.). For example, the virtual image would be: the face of User A being painted white with sheep horns on the head. However, her eyes, nose, mouth, and other facial features remain unchanged so that User A's friends can easily recognize her by these unchanged facial features.

With the virtual image generation method provided by the embodiments of the present disclosure, in response to a login event of a user, based on certain user attribute features of the target user and event attribute information for the target event in which the target user participates, a personalized virtual image of the target user that is easily recognizable by others and matches the participated event is generated by comprehensively considering the user features and event features, thereby improving the user experience.

Of course, in order to further enhance the user experience, when generating the virtual image of the target user based on the at least one user attribute feature of the target user and the event attribute feature, the XR platform can generate at least two virtual images for the target user, so that the user can choose a virtual image of his or her preference from the at least two virtual images, thereby improving the user experience through such user interaction. The specific implementation is as follows.

The operation of generating the virtual image of the target user according to the at least one user attribute feature of the target user and the event attribute information includes: generating at least two virtual images of the target user according to the at least one user attribute feature of the target user and the event attribute information. The at least two virtual images of the target user have the same at least one user attribute feature of the target user.

In practical applications, when the XR platform generates two or more virtual images for the target user, the two or more virtual images have the same at least one user attribute feature of the target user. For example, the two or more virtual images have the same eyes, eyebrows and/or hair color, etc., of the target user.

Following the previous example, the virtual image being generated for User A is again taken as an example. If a set of (e.g., 6) virtual images are generated for User A, in order for User A to be easily recognized by his or her friends on the XR platform, this set of virtual images of User A all have the same at least one user attribute feature, for example, the set of virtual images all include the eyes and mouth of User A in the real world.

In addition, in some other embodiments, when User A registers on the XR platform, in the case where User A has not participated in an event, the XR platform can also generate a set of virtual images for User A in advance according to the user attribute features of User A. In the subsequent login to the XR platform to participate in an event, User A can first query whether there is a suitable virtual image from the virtual images generated in advance, and if so, the virtual image can be used directly and quickly without generating the virtual image again, thus improving the efficiency of virtual image generation. For example, if the XR platform determines based on the user attribute features of User A (e.g., the age, occupation, etc.) that User A may participate in an event such as a formal conference, a party, or a meeting with friends, it can generate a set of virtual images for User A corresponding to these events in advance after User A registered. For example, a virtual image with formal dress and face beautification can be generated for the participation of User A in a formal conference event, a virtual image with horns, tails, and tattoos can be generated for the participation of User A in a party event, a virtual image with unique eyebrows can be generated for the participation of User A in a friends meeting event, and so on.

In addition, in the case where there are two or more participating users for the target event in which the target user participates, the XR platform will refer to the user attribute features of other users participating in the target event when generating a virtual image for the target user, so that multiple users participating in the same target event can have at least one virtual image feature. The specific implementation is as follows.

The operation of generating a virtual image of the target user according to the at least one user attribute feature of the target user and the event attribute information includes: determining, in the case of determining based on the event attribute information that there are at least two users participating in the target event, at least one user attribute feature of one or more other users participating in the target event other than the target user, and generating the virtual image of the target user according to the at least one user attribute feature of the target user, the at least one user attribute feature of the one or more other users, and the event attribute information. The virtual image of the target user has the at least one user attribute feature of the target user and has the at least one virtual image feature the same as that of the one or more other users.

Specifically, for a specific explanation of at least one user attribute feature of other users, reference may be made to at least one user attribute feature of the target user, which will not be repeated here. Further, the generation method for a single or multiple virtual images of other users is the same as the virtual image generation method for the target user.

In practical applications, in the case where it is determined that there are multiple users participating in the target event in which the target user participates, the XR platform also acquires at least one user attribute feature of the other users. Then, based on the at least one user attribute feature of the target user, the at least one user attribute feature of the other users, and the event attribute information, it generates a virtual image of that target user. Similarly, the generation of the virtual image of each of the other users also considers the at least one user attribute feature of the target user. In this way, the generated virtual image of the target user has the at least one user attribute feature of that target user and will also have the same at least one virtual image feature as the other users. The generated virtual image of each of the other users has its corresponding at least one user attribute feature and will also have the same at least one virtual image feature as the target user.

During specific implementations, for multiple users participating in a certain target event, part of the features of the virtual image generated by the XR platform for each user are the same and part of them are different, which allows these virtual images to be visually different from each other to avoid confusion, while making them visually similar, for example, by giving these virtual images an identical mark. That is, when generating virtual images for multiple users participating in the same target event, the XR platform will comprehensively consider the user attribute features of other users and the event attribute information to generate for each user a virtual image that is unique and slightly similar, thereby improving the user's experience of participating in a target event. For example, an animal tattoo is set on the face of the virtual image of each user participating in a costume party event, and the other features of the virtual image of each user are different and independent. At the same time, the time, location, and environment are kept consistent based on the event attribute information for the target event, and better settings of the virtual experience are allowed, for example, by defining of the amplitude of the sound of the virtual image for a specific musical event, and so on.

Moreover, while generating the virtual image of the target user, the XR platform also generates the virtual images of the other users, and displays the virtual image of the target user and the virtual images of the other users to the target user. The target user can subsequently refer to the virtual images of the other users and make manual adjustments to his/her own virtual image, thus increasing the personalized experience of virtual image generation. The specific implementation is as follows.

After generating the virtual image of the target user, the method further includes: generating one or more virtual images of the one or more other users and displaying the one or more virtual images of the one or more other users to the target user. The virtual images of the one or more other users have the at least one user attribute feature of the one or more other users and have the same at least one user attribute feature of the target user.

Then, after displaying the one or more virtual images of the one or more other users to the target user, the XR platform can receive an adjustment operation from the target user for his or her own virtual image according to the one or more virtual images of the one or more other users, thereby generating an adjusted virtual image of the target user, which further improves the target user's virtual image generation experience. The specific implementation is as follows.

After displaying the one or more virtual images of the one or more other users to the target user, the method further includes: receiving an adjustment operation of the target user for the virtual image of the target user according to the one or more virtual images of the one or more other users, to obtain an adjusted virtual image of the target user.

In addition, if the XR platform or the initiator of the target event sets a corresponding virtual image generation rule for the target event, the XR platform will subsequently generate an appropriate virtual image for the target user in combination with the virtual image generation rule when generating the virtual image for the target user. The specific implementation is as follows.

The operation of generating the virtual image of the target user according to the at least one user attribute feature of the target user and the event attribute information includes: determining a virtual image generation rule of the target event, and generating the virtual image of the target user according to the at least one user attribute feature of the target user, the virtual image generation rule, and the event attribute information. The virtual image of the target user has the at least one user attribute feature of the target user and has at least one user attribute feature corresponding to the virtual image generation rule.

Specifically, the virtual image generation rule can be set by the initiator of the target event or can be set by the XR platform according to the analysis result of the target event.

Still following the previous example, User A plans a virtual activity event for the Dolphins soccer club fans on the XR platform. User A can use the context manager of the XR platform to define a set of virtual image generation rules regarding the virtual activity event. For example, the clothes of the virtual image must be green, which may contain marine life, but not other organisms, and so on. Then, when a target user participates in the virtual activity event, the XR platform generates for the target user a virtual image that wears a green suit with a dolphin or other marine life on it.

In addition, the virtual image generation rule can also be applied to a target event in which multiple users participate, so that the virtual image of each user participating in the target event can be generated based on his or her own user attribute features, other user attribute features, the virtual image generation rule, and the event attribute information, thus ensuring the standardization and fun of virtual image generation. The specific implementation is as follows.

The operation of generating the virtual image of the target user according to the at least one user attribute feature of the target user and the event attribute information includes: determining a virtual image generation rule of the target event; determining, in the case of determining based on the event attribute information that there are at least two users participating in the target event, at least one user attribute feature of one or more other users participating in the target event other than the target user; and generating the virtual image of the target user according to the at least one user attribute feature of the target user, the at least one user attribute feature of the one or more other users, the virtual image generation rule, and the event attribute information. The virtual image of the target user has the at least one user attribute feature of the target user and has at least one virtual image feature the same as that of the one or more other users.

After the XR platform generates one or a set of virtual images of the target user, it can display these virtual images to the target user, and the target user can modify these virtual images according to his or her own preferences, so as to generate his or her own favorite virtual image, which reflects the personalization of virtual image generation. The specific implementation is as follows.

After generating the virtual image of the target user, the method further includes: displaying the virtual image of the target user to the target user, and receiving an adjustment operation of the target user for the virtual image of the target user, and obtaining an adjusted virtual image of the target user.

Here, the adjustment operation for the virtual image includes, but is not limited to, adding tattoos to the virtual image, modifying the hair color, etc., or deleting a certain disliked feature in the virtual image, and so on.

Moreover, when the target user performs the adjustment operation for the generated virtual image, the XR platform can record adjustment operation information of the target user for the virtual image of the target user in real time, for example, operation information of the target user for the modification of the nose, eyebrows or skin color, etc., of the virtual image of the target user. When the target user subsequently performs the virtual image generation again, in accordance with the historical adjustment operation information, the XR platform can determine the user's preference and generate a virtual image that is more suitable for the target user, thereby further improving the user experience. The specific implementation is as follows.

After obtaining the adjusted virtual image of the target user, the method further includes: recording adjustment operation information of the target user for the virtual image of the target user. Accordingly, the operation of generating the virtual image of the target user according to the at least one user attribute feature of the target user and the event attribute information includes: generating, again in response to the login event of the target user, the virtual image of the target user according to the at least one user attribute feature of the target user, the adjustment operation information, and the event attribute information.

Specifically, again in response to a login event of the target user, the virtual image of the target user is generated according to the at least one user attribute feature of the target user, the adjustment operation information, and the event attribute information. It can be understood that when the target user logins again to the XR platform to participate in a certain target event to perform virtual image generation, the XR platform not only considers the user attribute features of the target user and the event attribute information, but also combines the adjustment operation information of the target user for the historical virtual images to generate a virtual image that is more in line with the preferences of the target user, thereby further improving the virtual image generation experience of the target user.

Further, after generating the virtual image of the target user, in order to ensure the uniqueness of the virtual image and avoid duplicate generation of the virtual image or duplication with the virtual images of other users participating in the target event, the discriminator of this XR platform performs an assessment to the virtual image of this target user to ensure the user's virtual image generation experience. The specific implementation is as follows.

After generating the virtual image of the target user, the method further includes: in response to a determination that the virtual image of the target user satisfies a preset generation rule, generating a corresponding image identifier for the virtual image of the target user, and storing the virtual image of the target user and the corresponding image identifier generated for the virtual image of the target user to a database.

Here, the preset generation rule includes, but is not limited to, that there is no duplicate generation of the virtual image of the target user and that the virtual image of the target user is not duplicated with the virtual images of other users participating in the target event.

Specifically, taking the preset generation rule being that there is no duplicate generation of the virtual image of the target user and that the virtual image of the target user is not duplicated with the virtual images of the other users participating in the target event as an example, in the case of determining that the virtual image of the target user satisfies the preset generation rule, a corresponding image identifier is generated for the virtual image of the target user, and the virtual image of the target user and the corresponding image identifier generated for the virtual image of the target user are stored to a database. It can be understood that in the case of determining that the virtual image has not been generated for the target user before and that the virtual image is not the same as any of the virtual images of the other users participating in the target event, the XR platform generates a corresponding image identifier for the virtual image of the target user and stores the virtual image of the target user and the corresponding image identifier generated for the virtual image of the target user to the database. If the target user subsequently participates in this type of target event again, this virtual image can be quickly called for use for the target user in advance, thus improving the user experience.

In addition, in the case where the target user determines on the virtual image generation interface that there are two or more target events, the XR platform, when performing virtual image generation for each of the target events in which the target user participates, may cause the virtual image corresponding to each of the target events to have at least one identical user attribute feature or at least one identical virtual image feature, i.e., allowing consistency in the set of features across roles. The specific implementation is as follows.

The operation of generating the virtual image of the target user according to the at least one user attribute feature of the target user and the event attribute information includes: generating, in the case of determining that there are two or more target events, event attribute information for the participation of the target user in each of the target events according to the at least one user attribute feature of the target user and the event attribute information for each target event.

In some other embodiments of the present disclosure, if the login event triggered by the target user carries an initial dynamic picture containing the target object (such as a live commerce anchor, a news anchor, etc.), the corresponding virtual image can also be generated for the target object through the XR platform, so that the virtual image can replace the target object in the initial dynamic picture so as to perform live commerce or news broadcast, and so on. Such visualized image display can improve the user's interest in watching and increase the conversion rate. The specific implementation is as follows.

After acquiring event attribute information for the target event determined by the target user on the virtual image generation interface, the method further includes: determining an initial dynamic picture containing a target object, the initial dynamic picture being carried in the login event; generating the virtual image of the target object according to object attribute information for the target object and the event attribute information; and replacing the target object in the initial dynamic picture with the virtual image to generate a target dynamic picture.

Here, the target object may be understood differently in different specific implementation scenarios. For example, in the live commerce scenario, the target object can be understood as the live commerce anchor, while in the news or sports event live broadcast scenario, the target object can be understood as the news anchor or sports commentator, and so on.

The initial dynamic picture can be understood as a picture containing a dynamic target object, such as a jif dynamic picture, a dynamic picture formed by a plurality of video frames containing the target object, and so on.

Specifically, after determining the initial dynamic picture carried in the login event and containing the target object, the XR platform generates a virtual image of the target object based on the object attribute information for the target object (such as the facial features of the anchor) and the event attribute information, and then replaces the target object in the initial dynamic picture with the virtual image to generate the target dynamic picture. The specific implementation of generating the virtual image of the target object based on the object attribute information for the target object and the event attribute information is the same as that of generating the virtual image of the target user based on the user attribute features of the target user and the event attribute information in the embodiments described above, and will not be repeated herein.

Taking the target object being a sports commentator as an example, the embodiments will be discussed in detail.

During specific implementation, after determining the dynamic picture formed by a plurality of video frames that is carried in the login event and contains the sports commentator, according to the facial features of the sports commentator and the event attribute information (such as the type of the sports event: basketball game), the XR platform generates a virtual image of the sports commentator (such as generating a virtual image of the head having a basketball shape and containing the real sports commentator's eyes and nose), and then replaces the real sports commentator in each video frame with the virtual image to generate a target dynamic picture, thereby realizing live broadcast or video playback of the sports event based on the virtual image of the sports commentator.

In the following paragraphs, in conjunction with FIG. 3, further descriptions of the described virtual image generation method are provided, taking the application of using the virtual image generation method provided in embodiments of the present disclosure on the XR platform as an example. Here, FIG. 3 illustrates a schematic diagram of a processing process of a virtual image generation method according to some embodiments of the present disclosure, which specifically includes the following steps.

Figure 3:
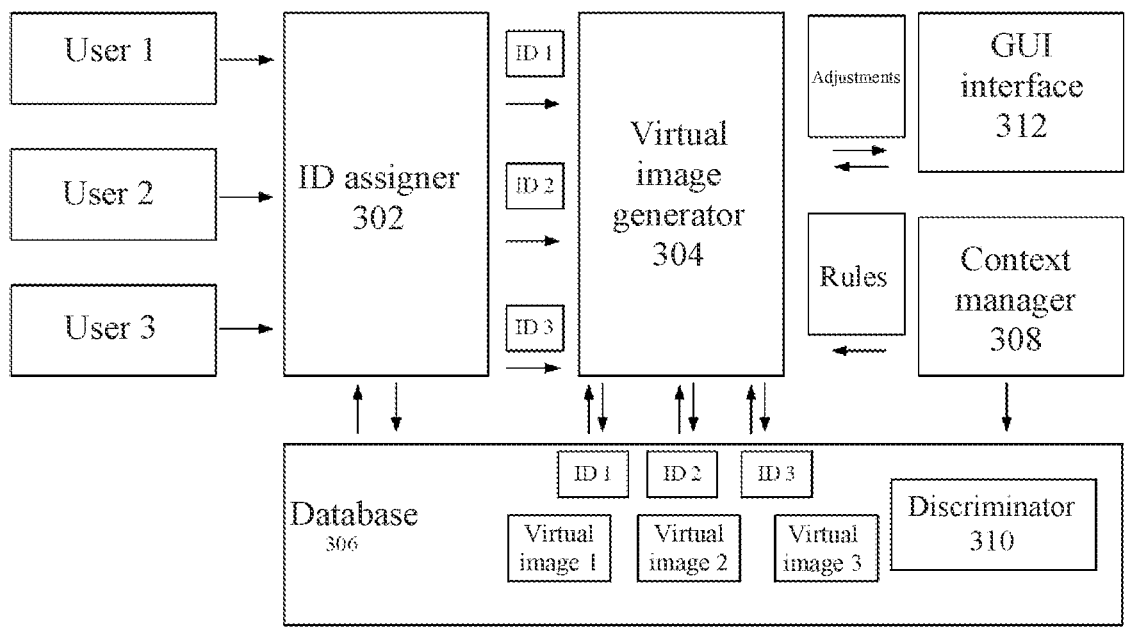
FIG. 3 is a schematic diagram of the processing process of a virtual image generation method according to some embodiments of the present disclosure.

The XR platform in FIG. 3 includes an ID assigner 302, a virtual image generator 304, a database 306, a context manager 308, a discriminator 310, and a GUI interface 312.

During specific implementation, the XR platform receives login account registration events from User 1, User 2 and User 3, and triggers the assignment of a unique user identifier by the ID assigner 302 separately to the login accounts of User 1, User 2, and User 3. For example, ID 1 is assigned for User 1, ID 2 is assigned for User 2, and ID 3 is assigned for User 3. At the same time, the XR platform also triggers the extraction of user attribute features by the feature extractor based on user photos uploaded by User 1, User 2 and User 3, or taken on the XR platform.

The XR platform stores the user identifiers of User 1, User 2, and User 3, and user attribute features corresponding to the user identifiers to the database 306.

Upon receiving the virtual image generation instructions for User 1, User 2, and User 3, the XR platform triggers the virtual image generator 304 to perform the acquisition of the user attribute features corresponding to User 1, User 2, and User 3 based on the user identifiers corresponding to the login accounts of the User 1, User 2 and User 3, respectively.

The virtual image generator 304 generates one or a set of virtual images separately for User 1, User 2, and User 3 according to the event attribute information for the target events that User 1, User 2, and User 3 respectively participate in and their corresponding user attribute features. For example, virtual image 1 is generated for User 1, virtual image 2 is generated for User 2, and virtual image 3 is generated for User 3. Also, the generated virtual images corresponding to User 1, User 2, and User 3 are displayed to User 1, User 2, and User 3 through the GUI interface 312, and User 1, User 2, and User 3 can manually adjust the virtual images according to their preferences in the GUI interface 312.

Moreover, in order to ensure that the generated virtual images of User 1, User 2 and User 3 are not duplicated with each other and not duplicated with their historically generated virtual images, the discriminator 310 of the XR platform performs assessments to the virtual images generated for User 1, User 2 and User 3. If no such duplication is detected, corresponding image identifiers for the corresponding virtual images of User 1, User 2 and User 3 are generated, and the virtual images and the corresponding image identifiers are stored into the database 306.

Figure 4:
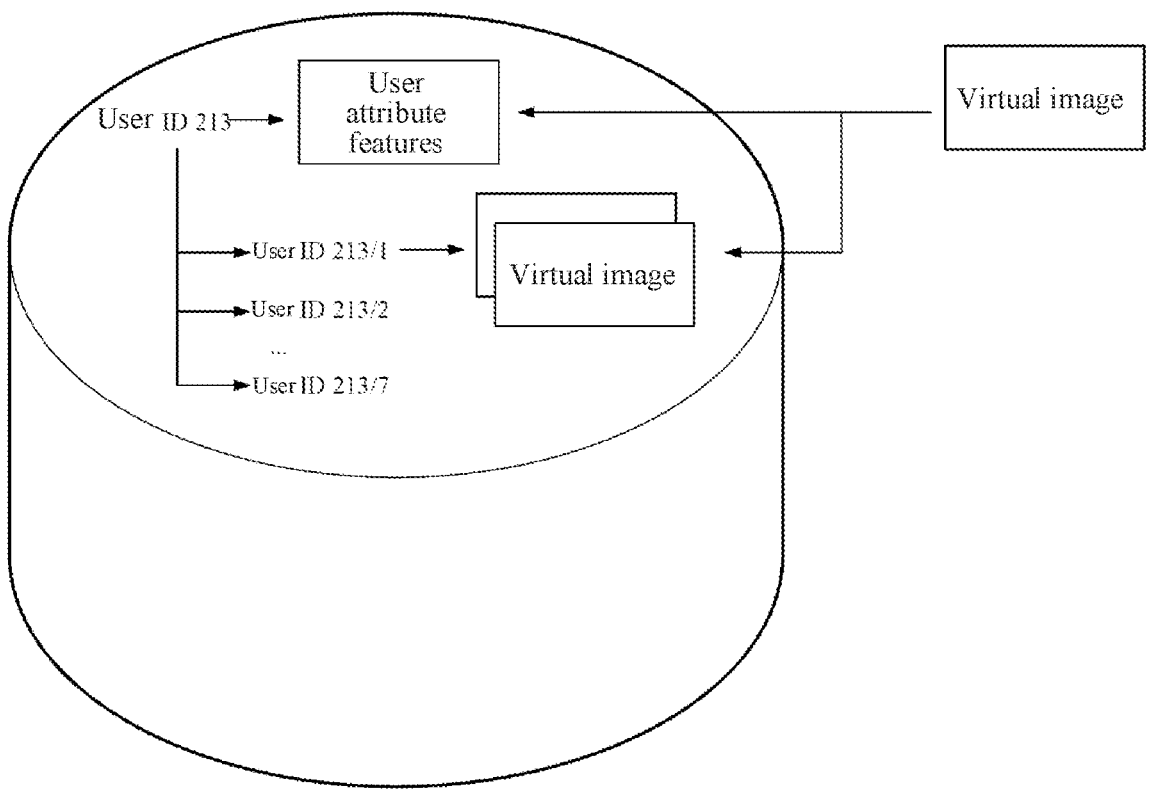
FIG. 4 is a schematic structural diagram of a database and a discriminator in a virtual image generation method according to some embodiments of the present disclosure.

Reference is made to FIG. 4. FIG. 4 illustrates a schematic structural diagram of a database and a discriminator in a virtual image generation method according to some embodiments of the present disclosure.

In FIG. 4, the database includes the user identifier, user ID 213, and the database stores the user attribute features corresponding to the user ID 213, the image identifier of the virtual image (e.g., virtual image ID 213/1, virtual image ID 213/2, . . . , virtual image ID 213/7, etc.), and the image identifier of each virtual image corresponds to one or a set of virtual images.

Specifically, after the virtual image is generated, the discriminator performs assessments to the newly generated virtual image based on the user attribute features corresponding to the user ID 213 and the historical virtual images, so as to make the conformance of the newly generated virtual image to the user attribute features, and thus no duplicate virtual image generation will be performed.

At the same time, when User 1, User 2 and User 3 perform event initiation on the XR platform, they can also use the context manager 308 of the XR platform to set the virtual image generation rules for the participation in the event, such as whether the background should be consistent, whether the hair color or clothing color should be uniform, or what modifications the users cannot make to the generated virtual images, or the like.

In addition, in order to avoid excessive space occupation in the database, the number of virtual images corresponding to the user ID of one user does not exceed a preset number threshold. For example, the preset number threshold is 300, then when the number of virtual images corresponding to a certain user ID exceeds 300, the virtual images placed into the database at the earliest in history will be deleted. It is also possible to set an expiration date for virtual images, etc., and the virtual images can be deleted automatically after the expiration date.

With respect to the virtual image generation method provided by the embodiments of the present disclosure, from the user's perspective, this method controls the style of the generated virtual image through the event attribute information for the participated event, so that the generated virtual image is more in line with the user's needs and one person is allowed to have multiple virtual images. Thus the user can use different virtual images when participating in various events, thus avoiding confusion and satisfying the user's needs. The generated virtual images can be recognized by others, which is in line with the virtual reality experience in the virtual environment. From the perspective of the context manager, with this method, unique audiovisual styles are allowed to be enforced on the metaverse experience, and by setting the virtual image generation rules for participation in the event, the generation of virtual images of the users participating in these metaverse experiences is enforced, and adjustments can be made according to their environments, for example, with regard to the style, dress code, look and sound, and so on.

Figure 5:
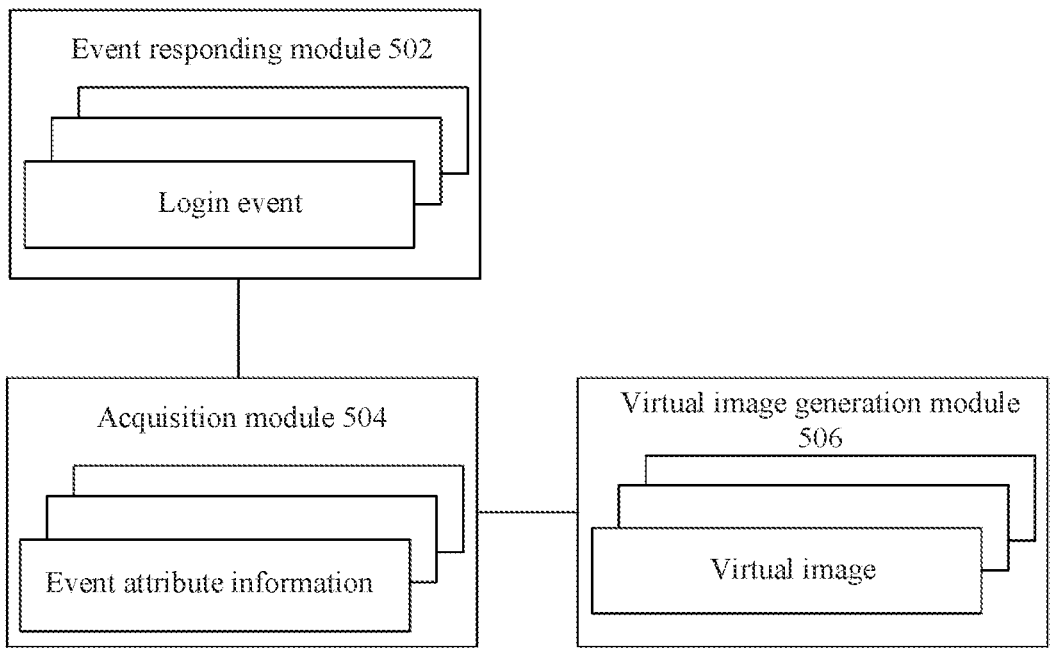
FIG. 5 is a schematic structural diagram of a virtual image generation apparatus according to some embodiments of the present disclosure.

Corresponding to the method embodiments described above, the present disclosure also provides embodiments for a virtual image generation apparatus. FIG. 5 illustrates a schematic structural diagram of a virtual image generation apparatus according to some embodiments of the present disclosure. As shown in FIG. 5, the apparatus includes: an event responding module 502, an acquisition module 504, and a virtual image generation module 506.

The event responding module 502 is configured to determine, in response to a login event of a target user, a user identifier of the target user, and display a virtual image generation interface to the target user.

The acquisition module 504 is configured to acquire at least one user attribute feature of the target user according to the user identifier, and acquire event attribute information for a target event that is determined by the target user on the virtual image generation interface.

The virtual image generation module 506 is configured to generate a virtual image of the target user according to the at least one user attribute feature of the target user and the event attribute information.

The virtual image of the target user has the at least one user attribute feature of the target user.

Optionally, the virtual image generation module 506 is further configured to generate at least two virtual images of the target user according to the at least one user attribute feature of the target user and the event attribute information. The at least two virtual images of the target user have the same at least one user attribute feature of the target user.

Optionally, the virtual image generation module 506 is further configured to determine, in the case of determining based on the event attribute information that there are at least two users participating in the target event, at least one user attribute feature of one or more other users participating in the target event other than the target user, and configured to generate the virtual image of the target user according to the at least one user attribute feature of the target user, the at least one user attribute feature of other users, and the event attribute information.

The virtual image of the target user has the at least one user attribute feature of the target user and has at least one virtual image feature the same as that of the one or more other users.

Optionally, the apparatus further includes an image display module configured to generate one or more virtual images of the one or more other users and display the virtual image(s) of the other user(s) to the target user. The virtual image(s) of the other user(s) have the at least one user attribute feature of other users and have the same at least one user attribute feature of the target user.

Optionally, the apparatus further includes a first image adjustment module configured to receive an adjustment operation of the target user for the virtual image of the target user according to the virtual images of other users, and to obtain an adjusted virtual image of the target user.

Optionally, the virtual image generation module 506 is further configured to determine a virtual image generation rule of the target event, and configured to generate the virtual image of the target user according to the at least one user attribute feature of the target user, the virtual image generation rule, and the event attribute information. The virtual image of the target user has the at least one user attribute feature of the target user and has at least one user attribute feature corresponding to the virtual image generation rule.

Optionally, the apparatus further includes a second image adjustment module configured to display the virtual image of the target user to the target user, to receive an adjustment operation of the target user for the virtual image of the target user, and to obtain an adjusted virtual image of the target user.

Optionally, the apparatus further includes an information recording module configured to record adjustment operation information of the target user for the virtual image of the target user. Correspondingly, the virtual image generation module 506 is further configured to generate, again in response to the login event of the target user, the virtual image of the target user according to the at least one user attribute feature of the target user, the adjustment operation information, and the event attribute information.

Optionally, the apparatus further includes a target dynamic picture generation module configured to determine an initial dynamic picture carried in the login event and containing a target object, to generate a virtual image of the target object according to object attribute information for the target object and the event attribute information, and to replace the target object in the initial dynamic picture with the virtual image to generate a target dynamic picture.

Optionally, the acquisition module 504 is further configured to acquire the event attribute information for the target event that is input by the target user on the virtual image generation interface or acquire the event attribute information for the target event that is chosen by the target user on the virtual image generation interface.

Optionally, the apparatus further includes a data storage module configured to, in response to a determination that the virtual image of the target user satisfies a preset generation rule, generate a corresponding image identifier for the virtual image of the target user, and to store the virtual image of the target user and the corresponding image identifier generated for the virtual image of the target user to a database.

Optionally, the apparatus further includes a registration module configured to determine, in response to a registration event of the target user, the user attribute feature of the target user according to a user image of the target user that is carried in the registration event, and configured to generate a corresponding user identifier for the target user and store the user identifier of the target user and the user attribute feature to a database.

Optionally, the registration module is further configured to display, in response to the registration event of the target user, a login account registration interface to the target user according to the registration event, acquire a user image of the target user upon receiving the login account and password input by the target user through the login account registration interface, and determine a user attribute feature of the target user according to the user image of the target user.

Optionally, the registration module is further configured to generate a corresponding user identifier for the target user according to the login account of the target user, and store the login account, the user identifier, and the user attribute feature of the target user to the database.

With the virtual image generation apparatus provided in the embodiments of the present disclosure, in response to a login event of a user, based on certain user attribute features of the target user and event attribute information for the target event in which the target user participates, a personalized virtual image of the target user that is easily recognizable by others and matches the participated event can be generated by comprehensively considering the user features and event features, thereby improving the user experience.

The above is an illustrative solution of a virtual image generation apparatus of some embodiments. It should be noted that the technical solution of the virtual image generation apparatus belongs to the same idea as the technical solution of the virtual image generation methods described above, and the details that are not described in detail in the technical solution of the virtual image generation apparatus can all be referred to the description of the technical solution of the virtual image generation methods described above.

Figure 6:
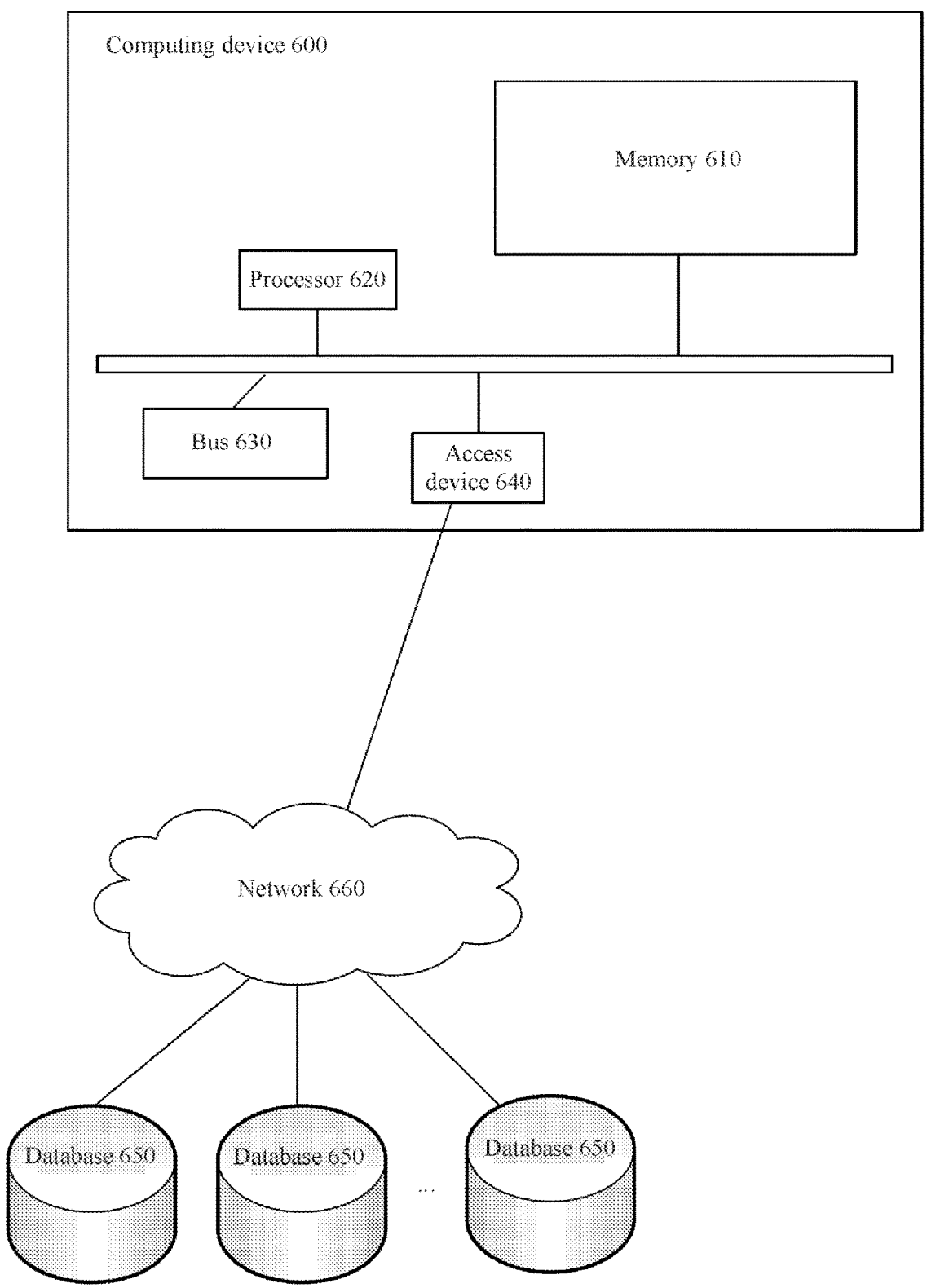
FIG. 6 is a structural block diagram of a computing device according to some embodiments of the present disclosure.

FIG. 6 illustrates a structural block diagram of a computing device 600 according to some embodiments of the present disclosure. Components of the computing device 600 include, but are not limited to, a memory 610 and a processor 620. The processor 620 is connected to the memory 610 through a bus 630, and a database 650 is used for storing data.

The computing device 600 further includes an access device 640, and the access device 640 enables the computing device 600 to communicate via one or more networks 660. Examples of these networks include the public switched telephone network (PSTN), local area network (LAN), wide area network (WAN), personal area network (PAN) or a combination of communication networks such as the Internet. The access device 640 may include one or more of any type of wired or wireless network interfaces (e.g., network interface cards (NIC)), such as IEEE 802.11 wireless local area network (WLAN) wireless interfaces, worldwide interoperability for microwave access (Wi-MAX) interfaces, Ethernet interfaces, universal serial bus (USB) interfaces, cellular network interfaces, Bluetooth interfaces, near field communication (NFC) interfaces, and so on.

In some embodiments of the present disclosure, the above components of the computing device 600 and other components not shown in FIG. 6 may also be connected to each other, for example, through a bus. It should be understood that the structural block diagram of the computing device shown in FIG. 6 is only for the purpose of illustration, and is not meant to limit the scope of the present disclosure. Those skilled in the art can add or replace other components as needed.

The computing device 600 may be any type of static or mobile computing device, including mobile computers or mobile computing devices (e.g., tablet computers, personal digital assistants, laptop computers, notebook computers, netbooks, etc.), mobile phones (e.g., smart phones), wearable computing devices (e.g., smart watches, smart glasses, etc.) or other types of mobile devices, or static computing devices such as desktop computers or PCs. The computing device 600 may also be a mobile or stationary server.

Among them, the processor 620 (which can be one or more processors) is configured to execute computer-executable instructions that, when executed by the processor, implement the steps of the virtual image generation methods described above.

The above is an illustrative solution of a computing device of some embodiment. It should be noted that the technical solution of the computing device belongs to the same idea as the technical solution of the virtual image generation methods described above, and the details that are not described in detail in the technical solution of the computing device can all be referred to the description of the technical solution of the virtual image generation methods described above.

Some embodiments of the present disclosure further provides a computer-readable storage medium (e.g., a non-transitory computer-readable storage medium) storing computer-executable instructions that, when executed by one or more processors, implement the steps of the virtual image generation methods described above.

The above is an illustrative solution of a computer-readable storage medium of some embodiments. It should be noted that the technical solution of the storage medium belongs to the same idea as the technical solution of the virtual image generation methods described above, and the details that are not described in detail in the technical solution of the storage medium can all be referred to the description of the technical solution of the virtual image generation methods described above.

Some embodiments of the present disclosure further provides a computer program, wherein the computer program, when executed in a computer, causes the computer to execute the steps of the virtual image generation methods described above.

The above is an illustrative solution of a computer program of some embodiments. It should be noted that the technical solution of the computer program belongs to the same idea as the technical solution of the virtual image generation methods described above, and the details that are not described in detail in the technical solution of the computer program can all be referred to the description of the technical solution of the virtual image generation methods described above.

Some embodiments of the present disclosure further provides an augmented reality (AR), virtual reality (VR), mixed reality (MR) or extended reality (XR) device, including: a memory and one or more processors. The memory is configured to store computer-executable instructions, and the one or more processors are configured to execute the computer-executable instructions that, when executed by the one or more processors, implement the steps of the virtual image generation methods described above.

The above is an illustrative solution of an augmented reality (AR), virtual reality (VR), mixed reality (MR) or extended reality (XR) device of some embodiments. It should be noted that the technical solution of the augmented reality (AR), virtual reality (VR), mixed reality (MR) or extended reality (XR) device belongs to the same idea as the technical solution of the virtual image generation methods described above, and the details that are not described in detail in the technical solution of the augmented reality (AR), virtual reality (VR), mixed reality (MR) or extended reality (XR) device can all be referred to the description of the technical solution of the virtual image generation methods described above.

Specific embodiments of the present disclosure have been described above. Other embodiments fall within the scope of the appended claims. In some cases, the actions or steps recorded in the claims can be performed in an order different from the orders in the embodiments and can still achieve desired results. In addition, the processes depicted in the accompanying drawings do not necessarily require specific sequences or consecutive sequences to achieve an expected result. In some embodiments, multi-task processing and parallel processing are also possible or may be advantageous.

The computer instructions include computer program code, which can be in source code form, object code form, executable file or some intermediate form, and so on. The computer-readable medium may include: any entity or apparatus capable of carrying the computer program code, recording medium, USB flash drive, removable hard drive, magnetic disc, optical disc, computer memory, read-only memory (ROM), random access memory (RAM), electrical carrier signal, telecommunications signal, and software distribution medium, and so on. It should be noted that the contents contained in the computer-readable medium can be appropriately increased or decreased according to the requirements of legislation and patent practice in the jurisdiction. For example, in some jurisdictions, according to the legislation and patent practice, the computer-readable medium does not include electric carrier signals and telecommunication signals.

It should be noted that, for the sake of simplicity of description, each of the aforementioned method embodiments is presented as a series of combinations of actions, but those skilled in the art should be aware that the embodiments of the present disclosure are not limited by the order of actions described, as some steps may be performed in other orders or simultaneously in accordance with the embodiments of the present disclosure. Secondly, those skilled in the art should also be aware that the embodiments described in the present disclosure are all preferred embodiments, and the actions and modules involved are not necessarily necessary for the embodiments in the present disclosure.

In the above embodiments, the description of each embodiment has its own focus, and what is not described in detail in some embodiments can be found in the relevant description of other embodiments.

The embodiments may further be described using the following clauses:

1: A virtual image generation method, comprising: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information, wherein the virtual image of the target user has the at least one user attribute feature of the target user.

2: The virtual image generation method as clause 1 describes, wherein generating the virtual image of the target user according to the at least one user attribute feature of the target user and the event attribute information comprises: generating at least two virtual images of the target user according to the at least one user attribute feature of the target user and the event attribute information, wherein the at least two virtual images of the target user have the same at least one user attribute feature of the target user.

3: The virtual image generation method as either of clauses 1 or 2 describe, wherein generating the virtual image of the target user according to the at least one user attribute feature of the target user and the event attribute information comprises: in response to determining based on the event attribute information that there are at least two users participating in the target event, determining at least one user attribute feature of one or more other users participating in the target event other than the target user; and generating the virtual image of the target user according to the at least one user attribute feature of the target user, the at least one user attribute feature of the one or more other users, and the event attribute information, wherein the virtual image of the target user has the at least one user attribute feature of the target user and has at least one virtual image feature the same as that of the one or more other users.

4: The virtual image generation method as clause 3 describes, further comprising: after generating the virtual image of the target user, generating one or more virtual images of the one or more other users and displaying the one or more virtual images of the one or more other users to the target user, wherein the one or more virtual images of the one or more other users have the at least one user attribute feature of the one or more other users and have the same at least one user attribute feature of the target user.

5: The virtual image generation method as clause 4 describes, further comprising: after displaying the one or more virtual images of the one or more other users to the target user, receiving an adjustment operation from the target user for the virtual image of the target user according to the one or more virtual images of the one or more other users, to obtain an adjusted virtual image of the target user.

6: The virtual image generation method as any of clauses 1-5 describe, wherein generating the virtual image of the target user according to the at least one user attribute feature of the target user and the event attribute information comprises: determining a virtual image generation rule of the target event; and generating the virtual image of the target user according to the at least one user attribute feature of the target user, the virtual image generation rule, and the event attribute information, wherein the virtual image of the target user has the at least one user attribute feature of the target user and has at least one user attribute feature corresponding to the virtual image generation rule.

7: The virtual image generation method as any of clauses 1-6 describe, further comprising: after generating the virtual image of the target user: displaying the virtual image of the target user to the target user; receiving an adjustment operation of the target user for the virtual image of the target user; and obtaining an adjusted virtual image of the target user.

8: The virtual image generation method as clause 7 describes, further comprising: after obtaining the adjusted virtual image of the target user: recording adjustment operation information of the target user for the virtual image of the target user; wherein the operation of generating the virtual image of the target user according to the at least one user attribute feature of the target user and the event attribute information comprises: generating, again in response to the login event of the target user, the virtual image of the target user according to the at least one user attribute feature of the target user, the adjustment operation information, and the event attribute information.

9: The virtual image generation method as any of clauses 1-8 describe, further comprising: after acquiring the event attribute information for the target event determined by the target user on the virtual image generation interface: determining an initial dynamic picture containing a target object, the initial dynamic picture being carried in the login event; generating the virtual image of the target object according to object attribute information for the target object and the event attribute information; and replacing the target object in the initial dynamic picture with the virtual image to generate a target dynamic picture.

10: The virtual image generation method as any of clauses 1-9 describe, further comprising: after generating the virtual image of the target user: in response to a determination that the virtual image of the target user satisfies a preset generation rule, generating a corresponding image identifier for the virtual image of the target user; and storing the virtual image of the target user and the corresponding image identifier generated for the virtual image of the target user to a database.

11: The virtual image generation method as any of clauses 1-10 describe, further comprising: before responding to the login event of the target user: determining, in response to a registration event of the target user, the user attribute feature of the target user according to a user image of the target user carried in the registration event; generating a corresponding user identifier for the target user; storing the user identifier of the target user and the user attribute feature to a database.

12: A virtual image generation method, comprising: receiving a login event triggered by a target user through a virtual image login interface, determining, in response to the login event of the target user, a user identifier of the target user, and displaying a virtual image generation interface to the target user; acquiring at least one user attribute feature of the target user from a database according to the user identifier, and acquiring event attribute information for a target event determined by the target user on the virtual image generation interface; and generating a virtual image of the target user according to the at least one user attribute feature of the target user and the event attribute information, and displaying the virtual image of the target user to the target user, wherein the virtual image of the target user has the at least one user attribute feature of the target user.

13: The virtual image generation method as clause 12 describes, further comprising: before receiving the login event triggered by the target user through the virtual image login interface: generating, in response to a registration event of the target user, a corresponding user identifier for the target user, and storing the user identifier of the target user to the database; and determining the user attribute feature of the target user according to a user image of the target user carried in the registration event, and storing the user attribute feature of the target user to the database.

14: A device for augmented reality (AR), virtual reality (VR), mixed reality (MR) or extended reality (XR), comprising: a memory for storing computer-executable instructions; and one or more processors configured to execute the computer-executable instructions to cause the device to perform operations comprising: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information, wherein the virtual image of the target user has the at least one user attribute feature of the target user.

15: The device as clause 14 describes, wherein generating the virtual image of the target user according to the at least one user attribute feature of the target user and the event attribute information further comprises: generating at least two virtual images of the target user according to the at least one user attribute feature of the target user and the event attribute information, wherein the at least two virtual images of the target user have the same at least one user attribute feature of the target user.

16: The device as either of clauses 14 or 15 describe, wherein generating the virtual image of the target user according to the at least one user attribute feature of the target user and the event attribute information further comprises: in response to determining based on the event attribute information that there are at least two users participating in the target event, determining at least one user attribute feature of one or more other users participating in the target event other than the target user; and generating the virtual image of the target user according to the at least one user attribute feature of the target user, the at least one user attribute feature of the one or more other users, and the event attribute information, wherein the virtual image of the target user has the at least one user attribute feature of the target user and has at least one virtual image feature the same as that of the one or more other users.

17: The device as clause 16 describes, wherein the operations further comprise: after generating the virtual image of the target user, generating one or more virtual images of the one or more other users and displaying the one or more virtual images of the one or more other users to the target user, wherein the one or more virtual images of the one or more other users have the at least one user attribute feature of the one or more other users and have the same at least one user attribute feature of the target user.

18: The device as clause 17 describes, wherein the operations further comprise: after displaying the one or more virtual images of the one or more other users to the target user, receiving an adjustment operation from the target user for the virtual image of the target user according to the one or more virtual images of the one or more other users, to obtain an adjusted virtual image of the target user.

19: The device as any of clauses 14-18 describe, wherein generating the virtual image of the target user according to the at least one user attribute feature of the target user and the event attribute information further comprises: determining a virtual image generation rule of the target event; and generating the virtual image of the target user according to the at least one user attribute feature of the target user, the virtual image generation rule, and the event attribute information, wherein the virtual image of the target user has the at least one user attribute feature of the target user and has at least one user attribute feature corresponding to the virtual image generation rule.

20: The device as any of clauses 14-19 describe, wherein the operations further comprise: after generating the virtual image of the target user: displaying the virtual image of the target user to the target user; receiving an adjustment operation of the target user for the virtual image of the target user; and obtaining an adjusted virtual image of the target user.

21: The device as clause 20 describes, wherein the operations further comprise: after obtaining the adjusted virtual image of the target user: recording adjustment operation information of the target user for the virtual image of the target user; wherein generating the virtual image of the target user according to the at least one user attribute feature of the target user and the event attribute information further comprises: generating, again in response to the login event of the target user, the virtual image of the target user according to the at least one user attribute feature of the target user, the adjustment operation information, and the event attribute information.

22: The device as any of clauses 14-21 describe, wherein the operations further comprise: after acquiring the event attribute information for the target event determined by the target user on the virtual image generation interface: determining an initial dynamic picture containing a target object, the initial dynamic picture being carried in the login event; generating the virtual image of the target object according to object attribute information for the target object and the event attribute information; and replacing the target object in the initial dynamic picture with the virtual image to generate a target dynamic picture.

23: The device as any of clauses 14-22 describe, wherein the operations further comprise: after generating the virtual image of the target user: in response to a determination that the virtual image of the target user satisfies a preset generation rule, generating a corresponding image identifier for the virtual image of the target user; and storing the virtual image of the target user and the corresponding image identifier generated for the virtual image of the target user to a database.

24: The device as any of clauses 14-23 describe, wherein the operations further comprise: before responding to the login event of the target user: determining, in response to a registration event of the target user, the user attribute feature of the target user according to a user image of the target user carried in the registration event; generating a corresponding user identifier for the target user; storing the user identifier of the target user and the user attribute feature to a database.

25: A non-transitory computer-readable storage medium storing a set of instructions that are executable by one or more processors of a device to cause the device to perform operations comprising: determining, in response to a login event of a target user, a user identifier of the target user, and displaying a virtual image generation interface to the target user; acquiring at least one user attribute feature of the target user according to the user identifier, and acquiring event attribute information for a target event determined by the target user on the virtual image generation interface; and generating a virtual image of the target user according to the at least one user attribute feature of the target user and the event attribute information, wherein the virtual image of the target user has the at least one user attribute feature of the target user.

26: The non-transitory computer-readable storage medium as clause 25 describes, wherein generating the virtual image of the target user according to the at least one user attribute feature of the target user and the event attribute information further comprises: generating at least two virtual images of the target user according to the at least one user attribute feature of the target user and the event attribute information, wherein the at least two virtual images of the target user have the same at least one user attribute feature of the target user.

27: The non-transitory computer-readable storage medium as either of clauses 25 or 26 describe, wherein generating the virtual image of the target user according to the at least one user attribute feature of the target user and the event attribute information further comprises: in response to determining based on the event attribute information that there are at least two users participating in the target event, determining at least one user attribute feature of one or more other users participating in the target event other than the target user; and generating the virtual image of the target user according to the at least one user attribute feature of the target user, the at least one user attribute feature of the one or more other users, and the event attribute information, wherein the virtual image of the target user has the at least one user attribute feature of the target user and has at least one virtual image feature the same as that of the one or more other users.

28: The non-transitory computer-readable storage medium as clause 27 describes, wherein the operations further comprise: after generating the virtual image of the target user, generating one or more virtual images of the one or more other users and displaying the one or more virtual images of the one or more other users to the target user, wherein the one or more virtual images of the one or more other users have the at least one user attribute feature of the one or more other users and have the same at least one user attribute feature of the target user.

29: The non-transitory computer-readable storage medium as clause 28 describes, wherein the operations further comprise: after displaying the one or more virtual images of the one or more other users to the target user, receiving an adjustment operation from the target user for the virtual image of the target user according to the one or more virtual images of the one or more other users, to obtain an adjusted virtual image of the target user.

30: The non-transitory computer-readable storage medium as any of clauses 25-29 describe, wherein generating the virtual image of the target user according to the at least one user attribute feature of the target user and the event attribute information by: determining a virtual image generation rule of the target event; and generating the virtual image of the target user according to the at least one user attribute feature of the target user, the virtual image generation rule, and the event attribute information, wherein the virtual image of the target user has the at least one user attribute feature of the target user and has at least one user attribute feature corresponding to the virtual image generation rule.

31: The non-transitory computer-readable storage medium as any of clauses 25-30 describe, wherein the operations further comprise: after generating the virtual image of the target user: displaying the virtual image of the target user to the target user; receiving an adjustment operation of the target user for the virtual image of the target user; and obtaining an adjusted virtual image of the target user.

32: The non-transitory computer-readable storage medium as clause 31 describe, wherein the operations further comprise: after obtaining the adjusted virtual image of the target user: recording adjustment operation information of the target user for the virtual image of the target user; wherein generating the virtual image of the target user according to the at least one user attribute feature of the target user and the event attribute information further comprises: generating, again in response to the login event of the target user, the virtual image of the target user according to the at least one user attribute feature of the target user, the adjustment operation information, and the event attribute information.

33: The non-transitory computer-readable storage medium as any of clauses 25-32 describe, wherein the operations further comprise: after acquiring the event attribute information for the target event determined by the target user on the virtual image generation interface: determining an initial dynamic picture containing a target object, the initial dynamic picture being carried in the login event; generating the virtual image of the target object according to object attribute information for the target object and the event attribute information; and replacing the target object in the initial dynamic picture with the virtual image to generate a target dynamic picture.

34: The non-transitory computer-readable storage medium as any of clauses 25-33 describe, wherein the operations further comprise: after generating the virtual image of the target user: in response to a determination that the virtual image of the target user satisfies a preset generation rule, generating a corresponding image identifier for the virtual image of the target user; and storing the virtual image of the target user and the corresponding image identifier generated for the virtual image of the target user to a database.

35: The non-transitory computer-readable storage medium as any of clauses 25-34 describe, wherein the operations further comprise: before responding to the login event of the target user: determining, in response to a registration event of the target user, the user attribute feature of the target user according to a user image of the target user carried in the registration event; generating a corresponding user identifier for the target user; and storing the user identifier of the target user and the user attribute feature to a database.

The embodiments of the present disclosure disclosed above are only used to help illustrate the present disclosure. Alternative embodiments are not exhaustive in all detail, nor is the disclosure limited to specific implementations described. Many modifications and changes can be made according to the contents of the embodiments of the present disclosure. The present disclosure selects and specifically describes these embodiments in order to better explain the principles and practical applications of the embodiments of the present disclosure, so that those skilled in the art can well understand and use the present disclosure. The present disclosure is limited only by the claims and their full scope and equivalents.

What is claimed is:

1. A virtual image generation method, comprising:
   before responding to a login event of a target user, determining, in response to a registration event of the target user, at least one user attribute feature of the target user according to a user image of the target user carried in the registration event;
   determining, in response to the login event of the target user, a user identifier of the target user, and displaying a virtual image generation interface to the target user;
   acquiring the at least one user attribute feature of the target user according to the user identifier, and acquiring event attribute information for a target event determined by the target user on the virtual image generation interface; and
   generating a virtual image of the target user according to the at least one user attribute feature of the target user and the event attribute information,
   wherein the virtual image of the target user has the at least one user attribute feature of the target user.

2. The virtual image generation method of claim 1, wherein generating the virtual image of the target user according to the at least one user attribute feature of the target user and the event attribute information comprises:
   generating at least two virtual images of the target user according to the at least one user attribute feature of the target user and the event attribute information, wherein the at least two virtual images of the target user have the same at least one user attribute feature of the target user.

3. The virtual image generation method of claim 1, wherein generating the virtual image of the target user according to the at least one user attribute feature of the target user and the event attribute information comprises:
   in response to determining based on the event attribute information that there are at least two users participating in the target event, determining at least one user attribute feature of one or more other users participating in the target event other than the target user; and
   generating the virtual image of the target user according to the at least one user attribute feature of the target user, the at least one user attribute feature of the one or more other users, and the event attribute information,
   wherein the virtual image of the target user has the at least one user attribute feature of the target user and has at least one virtual image feature the same as that of the one or more other users.

4. The virtual image generation method of claim 3, further comprising:
   after generating the virtual image of the target user, generating one or more virtual images of the one or more other users and displaying the one or more virtual images of the one or more other users to the target user, wherein the one or more virtual images of the one or more other users have the at least one user attribute feature of the one or more other users and have the same at least one user attribute feature of the target user.

5. The virtual image generation method of claim 4, further comprising:
   after displaying the one or more virtual images of the one or more other users to the target user, receiving an adjustment operation from the target user for the virtual image of the target user according to the one or more virtual images of the one or more other users, to obtain an adjusted virtual image of the target user.

6. The virtual image generation method of claim 1, wherein generating the virtual image of the target user according to the at least one user attribute feature of the target user and the event attribute information comprises:
   determining a virtual image generation rule of the target event; and
   generating the virtual image of the target user according to the at least one user attribute feature of the target user, the virtual image generation rule, and the event attribute information,
   wherein the virtual image of the target user has the at least one user attribute feature of the target user and has at least one user attribute feature corresponding to the virtual image generation rule.

7. The virtual image generation method of claim 1, further comprising:
   after generating the virtual image of the target user:
   displaying the virtual image of the target user to the target user;
   receiving an adjustment operation of the target user for the virtual image of the target user; and
   obtaining an adjusted virtual image of the target user.

8. The virtual image generation method of claim 7, further comprising:
   after obtaining the adjusted virtual image of the target user:
   recording adjustment operation information of the target user for the virtual image of the target user;
   wherein the operation of generating the virtual image of the target user according to the at least one user attribute feature of the target user and the event attribute information comprises:
   generating, again in response to the login event of the target user, the virtual image of the target user according to the at least one user attribute feature of the target user, the adjustment operation information, and the event attribute information.

9. The virtual image generation method of claim 1, further comprising:
   after acquiring the event attribute information for the target event determined by the target user on the virtual image generation interface:
   determining an initial dynamic picture containing a target object, the initial dynamic picture being carried in the login event;
   generating the virtual image of the target object according to object attribute information for the target object and the event attribute information; and
   replacing the target object in the initial dynamic picture with the virtual image to generate a target dynamic picture.

10. The virtual image generation method of claim 1, further comprising:
    after generating the virtual image of the target user:
    in response to a determination that the virtual image of the target user satisfies a preset generation rule, generating a corresponding image identifier for the virtual image of the target user; and
    storing the virtual image of the target user and the corresponding image identifier generated for the virtual image of the target user to a database.

11. The virtual image generation method of claim 1, further comprising:
    before responding to the login event of the target user:
    generating a corresponding user identifier for the target user; and
    storing the user identifier of the target user and the at least one user attribute feature to a database.

12. A device for augmented reality (AR), virtual reality (VR), mixed reality (MR) or extended reality (XR), comprising:
    a memory for storing computer-executable instructions; and
    one or more processors configured to execute the computer-executable instructions to cause the device to perform operations comprising:
    before responding to a login event of a target user, determining, in response to a registration event of the target user, at least one user attribute feature of the target user according to a user image of the target user carried in the registration event;
    determining, in response to the login event of the target user, a user identifier of the target user, and displaying a virtual image generation interface to the target user;
    acquiring the at least one user attribute feature of the target user according to the user identifier, and acquiring event attribute information for a target event determined by the target user on the virtual image generation interface; and
    generating a virtual image of the target user according to the at least one user attribute feature of the target user and the event attribute information,
    wherein the virtual image of the target user has the at least one user attribute feature of the target user.

13. The device of claim 12, wherein generating the virtual image of the target user according to the at least one user attribute feature of the target user and the event attribute information further comprises:
    generating at least two virtual images of the target user according to the at least one user attribute feature of the target user and the event attribute information, wherein the at least two virtual images of the target user have the same at least one user attribute feature of the target user.

14. The device of claim 12, wherein generating the virtual image of the target user according to the at least one user attribute feature of the target user and the event attribute information further comprises:
    in response to determining based on the event attribute information that there are at least two users participating in the target event, determining at least one user attribute feature of one or more other users participating in the target event other than the target user; and
    generating the virtual image of the target user according to the at least one user attribute feature of the target user, the at least one user attribute feature of the one or more other users, and the event attribute information,
    wherein the virtual image of the target user has the at least one user attribute feature of the target user and has at least one virtual image feature the same as that of the one or more other users.

15. The device of claim 14, wherein the operations further comprise:
    after generating the virtual image of the target user, generating one or more virtual images of the one or more other users and displaying the one or more virtual images of the one or more other users to the target user, wherein the one or more virtual images of the one or more other users have the at least one user attribute feature of the one or more other users and have the same at least one user attribute feature of the target user.

16. The device of claim 15, wherein the operations further comprise:

after displaying the one or more virtual images of the one or more other users to the target user, receiving an adjustment operation from the target user for the virtual image of the target user according to the one or more virtual images of the one or more other users, to obtain an adjusted virtual image of the target user.

17. The device of claim 12, wherein generating the virtual image of the target user according to the at least one user attribute feature of the target user and the event attribute information further comprises:
    determining a virtual image generation rule of the target event; and
    generating the virtual image of the target user according to the at least one user attribute feature of the target user, the virtual image generation rule, and the event attribute information,
    wherein the virtual image of the target user has the at least one user attribute feature of the target user and has at least one user attribute feature corresponding to the virtual image generation rule.

18. The device of claim 12, wherein the operations further comprise:
    after generating the virtual image of the target user:
        displaying the virtual image of the target user to the target user;
        receiving an adjustment operation of the target user for the virtual image of the target user; and
        obtaining an adjusted virtual image of the target user.

19. The device of claim 18, wherein the operations further comprise:
    after obtaining the adjusted virtual image of the target user:
        recording adjustment operation information of the target user for the virtual image of the target user;
    wherein generating the virtual image of the target user according to the at least one user attribute feature of the target user and the event attribute information further comprises:
        generating, again in response to the login event of the target user, the virtual image of the target user according to the at least one user attribute feature of the target user, the adjustment operation information, and the event attribute information.

20. A non-transitory computer-readable storage medium storing a set of instructions that are executable by one or more processors of a device to cause the device to perform operations comprising:
    before responding to a login event of a target user, determining, in response to a registration event of the target user, at least one user attribute feature of the target user according to a user image of the target user carried in the registration event;
    determining, in response to the login event of the target user, a user identifier of the target user, and displaying a virtual image generation interface to the target user;
    acquiring the at least one user attribute feature of the target user according to the user identifier, and acquiring event attribute information for a target event determined by the target user on the virtual image generation interface; and
    generating a virtual image of the target user according to the at least one user attribute feature of the target user and the event attribute information,
    wherein the virtual image of the target user has the at least one user attribute feature of the target user.

\* \* \* \* \*